US011029877B1

(12) United States Patent
LeTourneau

(10) Patent No.: US 11,029,877 B1
(45) Date of Patent: Jun. 8, 2021

(54) EFFICIENT PRIMAL COMPUTING SYSTEM

(71) Applicant: John J. LeTourneau, Laguna Woods, CA (US)

(72) Inventor: John J. LeTourneau, Laguna Woods, CA (US)

( * ) Notice: Subject to any disclaimer, the term of this patent is extended or adjusted under 35 U.S.C. 154(b) by 0 days.

(21) Appl. No.: 17/114,387

(22) Filed: Dec. 7, 2020

Related U.S. Application Data

(60) Provisional application No. 62/945,134, filed on Dec. 7, 2019.

(51) Int. Cl.
*G06F 9/4401* (2018.01)
*G06F 3/06* (2006.01)

(52) U.S. Cl.
CPC .......... *G06F 3/0655* (2013.01); *G06F 3/0604* (2013.01); *G06F 3/0676* (2013.01); *G06F 3/0679* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 5,787,432 A | * | 7/1998 | LeTourneau | G06F 9/44 707/741 |
| 7,356,549 B1 | * | 4/2008 | Bruso | G06F 16/2246 707/696 |

(Continued)

OTHER PUBLICATIONS

Elgot & Robinson, "Random-Access Stored-Program Machines, an Approach to Programming Languages," Journal of the Association for Computing Machinery, Oct. 1964, pp. 365-399, vol. 11 No. 4, Association for Computing Machinery, New York, New York.

(Continued)

*Primary Examiner* — Elias Mamo
(74) *Attorney, Agent, or Firm* — William J. Benman; Benman, Brown & Williams

(57) ABSTRACT

A computing system and method. The inventive system comprises a user interface for providing user input and output and a RASP controller operationally coupled to the user interface. The RASP controller includes a central processing unit implemented with a microprocessor adapted to program instructions stored in a tangible medium and at least one RASP registers configured to store encoded data. A RASP formatter is operationally coupled to the RASP controller and a RASP memory operationally coupled to the RASP controller and the RASP formatter. A boot memory provides program instructions for execution by the central processing unit whereby computing system effects data storage and retrieval using a primal file structure. In a more specific implementation, an input buffer is included and adapted to store electrical signals representing an arbitrary finite data sequence. The RASP formatter is operationally coupled to the input buffer and includes a converter adapted to convert the sequence into a natural number. The RASP formatter further includes a divider (multiplier?) operationally coupled to the converter and adapted to factor the natural number. The RASP formatter further includes an adder operationally coupled to the divider and adapted to concatenate indices of the factored natural number to form a primary binary string and store the primary binary string in the RASP memory.

16 Claims, 15 Drawing Sheets

(56) References Cited

U.S. PATENT DOCUMENTS

| | | | | |
|---|---|---|---|---|
| 7,603,346 | B1* | 10/2009 | Depelteau | G06F 16/9027 |
| 7,984,273 | B2* | 7/2011 | Sprangle | G06F 9/383 |
| | | | | 712/225 |
| 9,842,130 | B2* | 12/2017 | Schiffmann | G06F 16/211 |
| 2014/0082021 | A1* | 3/2014 | Hendrey | G06F 16/90344 |
| | | | | 707/772 |
| 2016/0359616 | A1* | 12/2016 | LeTourneau | H04N 19/68 |

OTHER PUBLICATIONS

Hartmanis, "Computational Complexity of Random Access Stored Program Machines," Department of Computer Science, Cornell University, Ithaca, New York.

Letourneau, "An arithmetic of hierarchical structure." Abstracts of papers presented to the American Mathematical Society, 1988, pp. 281-344, vol. 9 No. 4, American Mathematical Society, Providence, Rhode Island. Points to the similarity of the iconic, arithmetic, and algebraic views of the same object.

Letourneau, "A logical characterization of recursively enumerable relations" Abstracts of papers presented to the American Mathematical Society, 1989, pp. 145-192, vol. 10 No. 2, American Mathematical Society, Providence, Rhode Island. Shows logical universality of tree manipulation if the trees involved are not deeper than three levels deep.

Kirby, "Finitary Set Theory," Notre Dame Journal of Formal Logic, Nov. 2009, vol. 50, University of Notre Dame, South Bend, Indiana. The adjunction operator of Claims 19 and 22 adds a single new element, x, to an existing set, y, creating a new set, z, as the basis for building a finitary set theory.

Šipoš & Šimoňák, "RASP Abstract Machine Emulator—Extending the EmuStudio Platform," Acta Electrotechnica et Informatica, 2017, pp. 33-41, vol. 17 No. 3, Faculty of Electrical Engineering and Informatics, Technical University of Košice, Slovak Republic. The Primal RASP machine allows and manages indirect adressing by providing a specific table of labeled trees.

* cited by examiner

RASP Register Architecture

Figure 5

PBS Static Table

| Icons | | Terms | Primal Binary Strings |
|---|---|---|---|
| 0 | [2] | B | < 1 0 > |
| 1 | [3] | C | < 1 1 0 > |
| 2 | [5] | B#C | < 1 1 1 0 > |
| 3 | [7] | C#C | < 1 1 1 1 0 > |
| 4 | [11] | B#(B#C) | < 1 001010 0 > |
| 5 | [13] | B#C)#C | < 1 1111 0 > |
| 6 | [17] | B#(C#C) | < 1 001011 0 > |
| 7 | [19] | (C#C)#C | < 1 11111 0 > |
| 8 | [23] | B#(B#(B#C)) | < 1 00101010 0 > |
| 9 | [29] | C#(C#C) | < 1 0011011 0 > |
| 11 | [31] | B#((B#C)#C) | < 1 0010111 0 > |
| 12 | [37] | (B#(B#C))#C | < 1 1001010 0 > |
| 13 | [41] | B#(B#(C#C)) | < 1 00101011 0 > |
| 14 | [43] | ((B#C)#C)#C | < 1 1111110 > |

Figure 6

Primal RASP machine operations

1. Load $[k]_2$ into register Z;
2. Load $<1> \_ [k]_2$ into register Z, $[k]_2$ not an ORD;
3. Load $<11> \_ [k]_2$ into register Z, $[k]_2$ an ORD;
4. Load $<100> \_ [j]_2 \_ [k]_2$ into register Z;
5. Empty register X
6. Read register X and place in register Z;
7. Read register X and place $<1> \_ X$ in register Z, X content not an ORD;
8. Read register X and place $<11> \_ X$ in register Z, X content an ORD;
9. Read registers X and Y and load $<1001> \_ [x]_2 \_ [y]_2$ into register Z as x#y.
10. Move register X to register Y.

EFFICIENT PRIMAL COMPUTING SYSTEM

BACKGROUND OF THE INVENTION

Field of the Invention

The present invention relates to computing systems. More specifically, the present invention relates to systems for organizing, locating, storing, and retrieving electronic files on a computer or network of computers.

Description of the Related Art

Computing systems generate, store and retrieve large amounts of data. Over time, data storage and retrieval tend to limit the speed and efficiency of a computing system. As noted above, in the ongoing effort to improve computing speed, numerous techniques and designs have been developed to improve the speed and efficiency of a computing system. One such technique involves representing, storing and retrieving data stored in a prime-like representational manner.

Modern Software Machines can be described using algebraic structures that are based on the finite binary strings (or any other recursive subset of the finite binary strings) as objects, and a finite set of recursively enumerable operations as manipulation methods.

Register machines have been one of the most useful classes of modern abstract software machines and are commonly used by both mathematicians and computer scientists to simulate and study the interaction of the various language aspects of computation. The most computer-like register machines are the Random Access Stored Program (RASP) machines. But, it has been shown that without some form of indirection, these RASP machines are not Turing complete. This need for indirection limits the use of RASP machines.

Hence, there is a need in the art for an improved computing system architecture utilizing RASP that is not limited by indirection limits.

SUMMARY OF THE INVENTION

The need in the art is addressed by the novel efficient computing system and architecture of the present invention. The inventive system comprises a user interface for providing user input and output and a RASP controller operationally coupled to the user interface. The RASP controller includes a central processing unit implemented with a microprocessor adapted to program instructions stored in a tangible medium and at least one RASP registers configured to store encoded data. A RASP formatter is operationally coupled to the RASP controller and a RASP memory operationally coupled to the RASP controller and the RASP formatter. A boot memory provides program instructions for execution by the central processing unit whereby computing system effects data storage and retrieval using a primal file structure.

In a more specific implementation, an input buffer is included and adapted to store electrical signals representing an arbitrary finite data sequence. The RASP formatter is operationally coupled to the input buffer and includes a converter adapted to convert the finite data sequence into a natural number. The RASP formatter further includes a multiplier operationally coupled to the converter and adapted to factor the natural number. The RASP formatter further includes an adder operationally coupled to the divider and adapted to concatenate indices of the factored natural number to form a primary binary string and store the primary binary string in the RASP memory.

In more specific embodiments, the system outputs a primal binary string that defines a B-tree structure. In still more specific embodiments, the B-tree structure is part of a forest of B-tree structures. In yet more specific embodiments, each root of the B-tree forest is defined by a natural number expressed in binary primal notation. In more specific embodiments, each unique root of the B-tree in the B-tree forest is identified by a prime natural number larger than 3. In other more specific embodiments, each unique root of the B-tree forest is stored as the left-hand element of a primal-ordered pair. And in yet more specific embodiments, the left-hand element of an ordered pair represents the position of the B-tree in the forest of B-tree structures. In other more specific embodiments, the left-hand element of an ordered pair is a binary primal sequence.

Returning to the most basic description of the invention above, more specific embodiments include those for which the primal binary strings form a random-access table. In more specific embodiments, the random-access table uses fewer than 2*Log(p) bits to represent the $p^{th}$ entry in the random-access table for any prime p. In still more specific embodiments, the first element of the random-access table is the finite binary sequence <1 0>, and the second element of the random-access table is the finite binary sequence <1 1 0>.

In other embodiments of the basic system described above, each root of the B-tree in the forest of B-trees is named by a prime natural number larger than three, the prime natural number being expressed in binary primal string notation and further wherein the prime natural number is the left component of a primal-ordered pair. In more specific embodiments, each root of the B-tree in the forest of B-trees is named by a unique prime natural number larger than three, and wherein a binary primal sequence is associated with the unique root of the B-tree, and further wherein the binary primal sequence is stored as the marked position in the right-hand element of a primal-ordered pair. In still more specific embodiments, each root of the B-tree in the forest B-trees is named by a unique prime natural number larger than three, and wherein a finite multiset of binary primal sequence is associated with the unique root of the B-tree, and the binary primal sequence is stored as the marked positions in the right-hand element of a primal-ordered pair.

BRIEF DESCRIPTION OF THE DRAWINGS

FIG. 5 is a table that illustrates the first few Primal Binary Strings in their natural order as produced by the RASP Formatter of FIG. 1 in accordance with the present teachings.

FIG. 6 is a complete list of commands supported by the RASP computing system of FIG. 1 in accordance with the present teachings.

DESCRIPTION OF THE INVENTION

Figure 1:
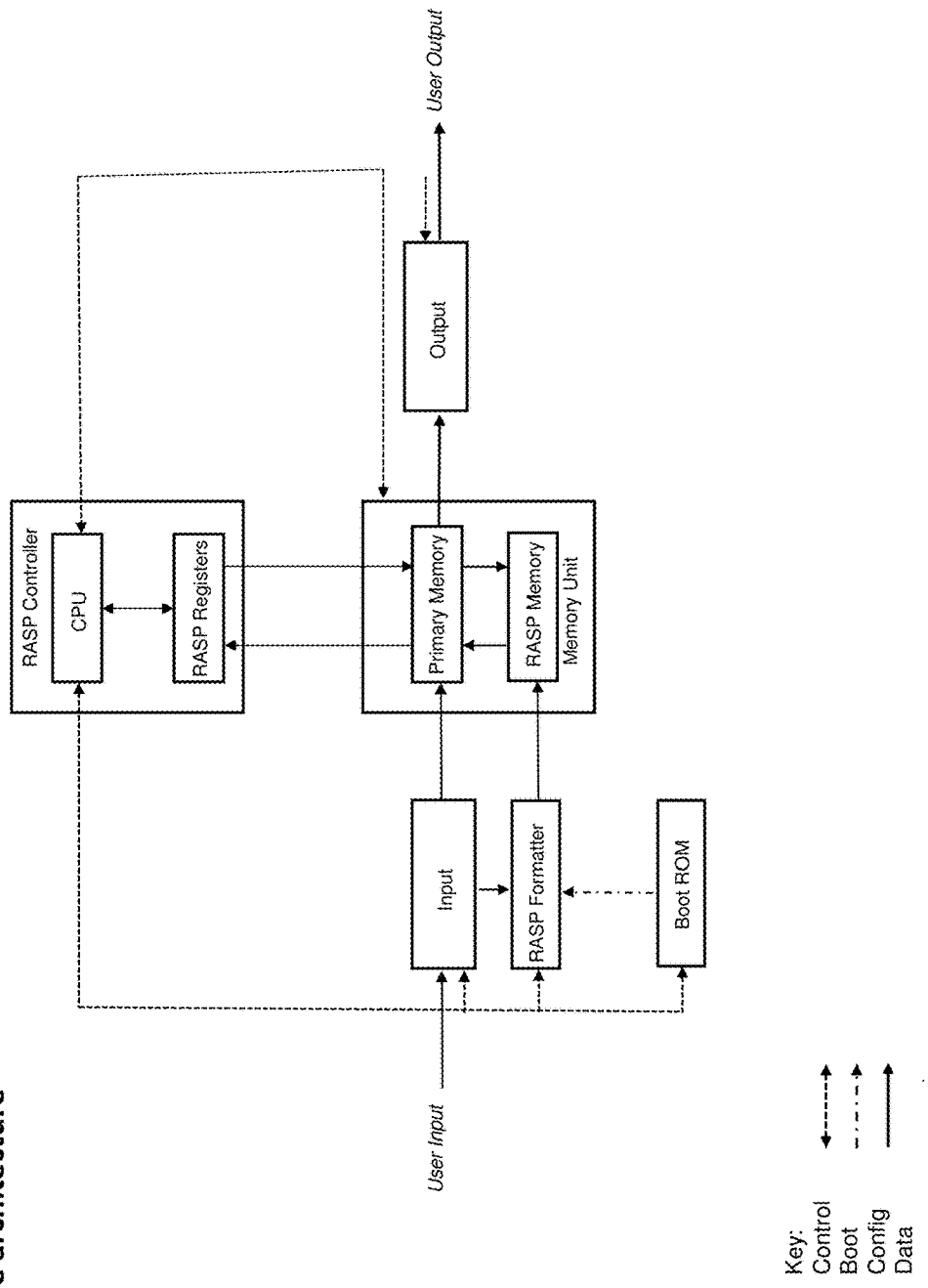
FIG. 1 is a block diagram of an illustrative embodiment of the efficient computing system architecture of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As noted above, in the ongoing effort to improve computing speed, numerous techniques and designs have been developed to improve the speed and efficiency of a computing system. One such technique involves representing, storing and retrieving data stored in a prime-like natural number representational manner.

For example, in a variety of fields, data or sets of data, may be represented in a hierarchical fashion; this representation may create useful information such as a particular relationship or a pattern of relationships between particular groups of data.

The most common computer file structure in use today is based on the manipulation of a collection of all finite sequences of natural numbers. However, this approach to file organization has serious limitations based on the inherent limitations to the scalability of such sequences. Moreover, the use of natural numbers requires step-wise traversal of file hierarchies that is time consuming and computationally intensive, especially when files are stored in the so-called "cloud" across multiple servers each having its own file structure.

In addition, manipulating or even recognizing specific data representations or patterns is not straightforward, particularly when the data is arranged in a hierarchy. Without loss of generality, examples may include a database, and further, without limitation, a relational database. Techniques for performing operations on such databases or recognizing specific patterns, for example, may be computationally complex, time consuming, and otherwise cumbersome. A need, therefore, continues to exist for improved techniques for performing such operations or recognizing hierarchical patterns.

As noted above, the need in the art is addressed by the novel efficient computing system and architecture of the present invention. The inventive system comprises a user interface for providing user input and output and a RASP controller operationally coupled to the user interface. The RASP controller includes a central processing unit implemented with a microprocessor adapted to program instructions stored in a tangible medium and at least one RASP registers configured to store encoded data. A RASP formatter is operationally coupled to the RASP controller and a RASP memory operationally coupled to the RASP controller and the RASP formatter. A boot memory provides program instructions for execution by the central processing unit whereby computing system effects data storage and retrieval using a primal file structure.

In a more specific implementation, an input buffer is included and adapted to store electrical signals representing an arbitrary finite data sequence. The RASP formatter is operationally coupled to the input buffer and includes a converter adapted to convert the sequence into a natural number. The RASP formatter further includes a divider (multiplier?) operationally coupled to the converter and adapted to factor the natural number. The RASP formatter further includes an adder operationally coupled to the divider and adapted to concatenate indices of the factored natural number to form a primary binary string and store the primary binary string in the RASP memory.

FIG. 1 is a block diagram of an illustrative embodiment of the efficient computing system architecture of the present invention. As shown in FIG. 1, the inventive computing architecture includes a RASP Controller. In the illustrative embodiment, the RASP Controller includes a central processing unit (CPU) and a set of RASP registers. The CPU can be implemented with a conventional microprocessor on a printed circuit board. The RASP registers may be implemented as conventional registers internal or external relative to the CPU. As discussed more fully below, in accordance with the present teachings, the unique signals representing data stored in the registers enable the registers to function as RASP registers.

The RASP controller stores and retrieves RASP data in memory unit with a primary memory and a RASP memory via the RASP registers.

As discussed more fully below, the computing architecture further includes a RASP formatter that operates on input data under control of the RASP controller and formats the data stored in the RASP memory.

Figure 2:
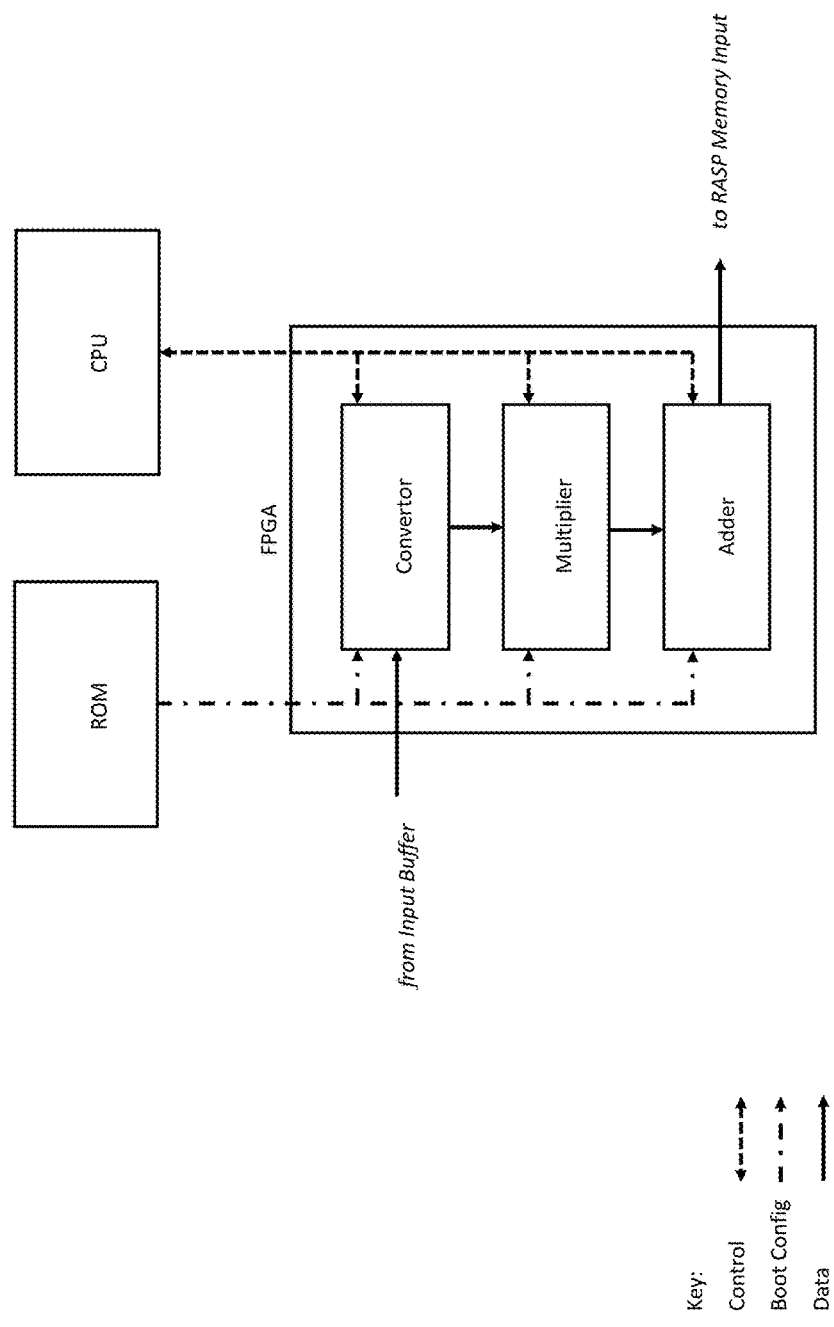
FIG. 2 is a block diagram of an illustrative implementation of the RASP formatter of FIG. 1 in accordance with the present teachings.

User input and output are implemented via conventional user input and output buffers. A boot ROM is provided for startup operations in a conventional manner FIG. 2 is a block diagram of an illustrative implementation of the RASP formatter of FIG. 1 in accordance with the present teachings. As shown in FIG. 2 the RASP Formatter includes a converter, a multiplier and an adder. The RASP formatter receives an arbitrary finite data sequence (AFS) from the input buffer including metadata of B-Tree source. In accordance with the present teachings, the converter then converts the sequence into natural number that names the position of the AFS from its originating B-Tree. Next, the multiplier factors the natural number in one or more primes and feeds it to the adder. For each of the primes in the factorization the CPU collects the index of the primes where the index of 2 is 0, of 3 is 1, of 5 is 2, etc. The adder concatenates the value of line i of the RASP Table for each I in the collection of indices created by the CPU. If more than one index is created, then the string output by the formatter is prefixed with <100> by the adder. This creates a Primal Binary String (PBS). If exactly one index is created by the formatter, then the CPU proceeds to store the resulting PBS in the RASP Table, located in RASP Memory, using the random-access property of the table. The adder concatenates the value of the indices of the factored natural number to form a Primal Binary String (PBS). The PBS is then sent to the RASP memory.

Figure 3:
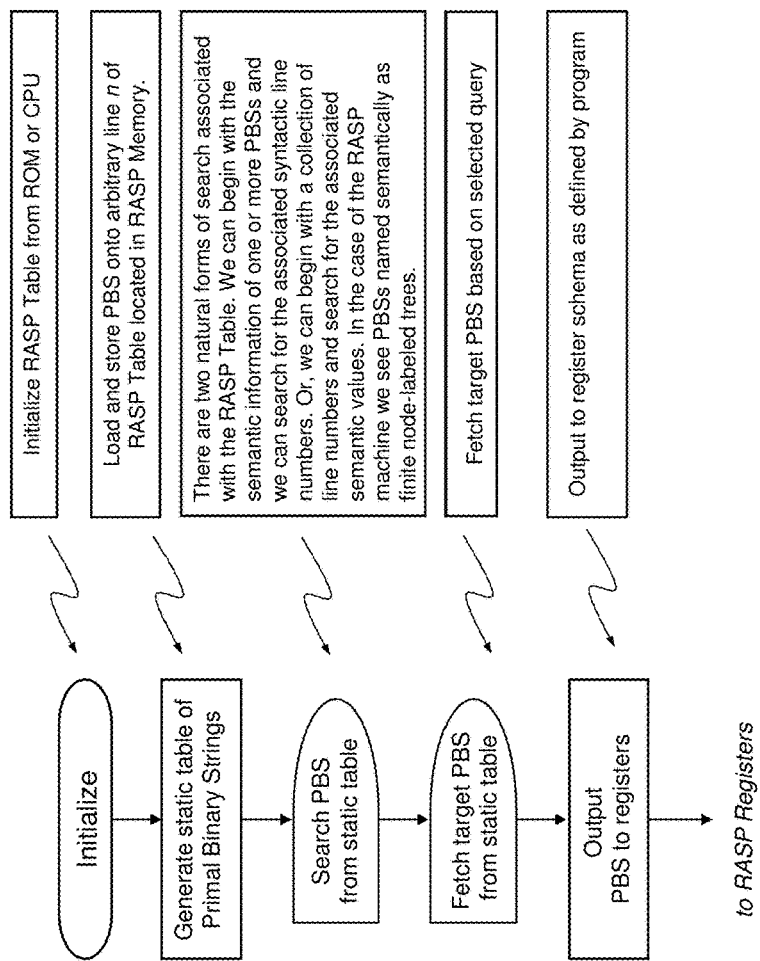
FIG. 3 is a flow diagram that illustrates the operation of the RASP controller of FIG. 1 in accordance with the present teachings.

FIG. 3 is a flow diagram that illustrates the operation of the RASP controller of FIG. 1 in accordance with the present teachings.

Figure 4:
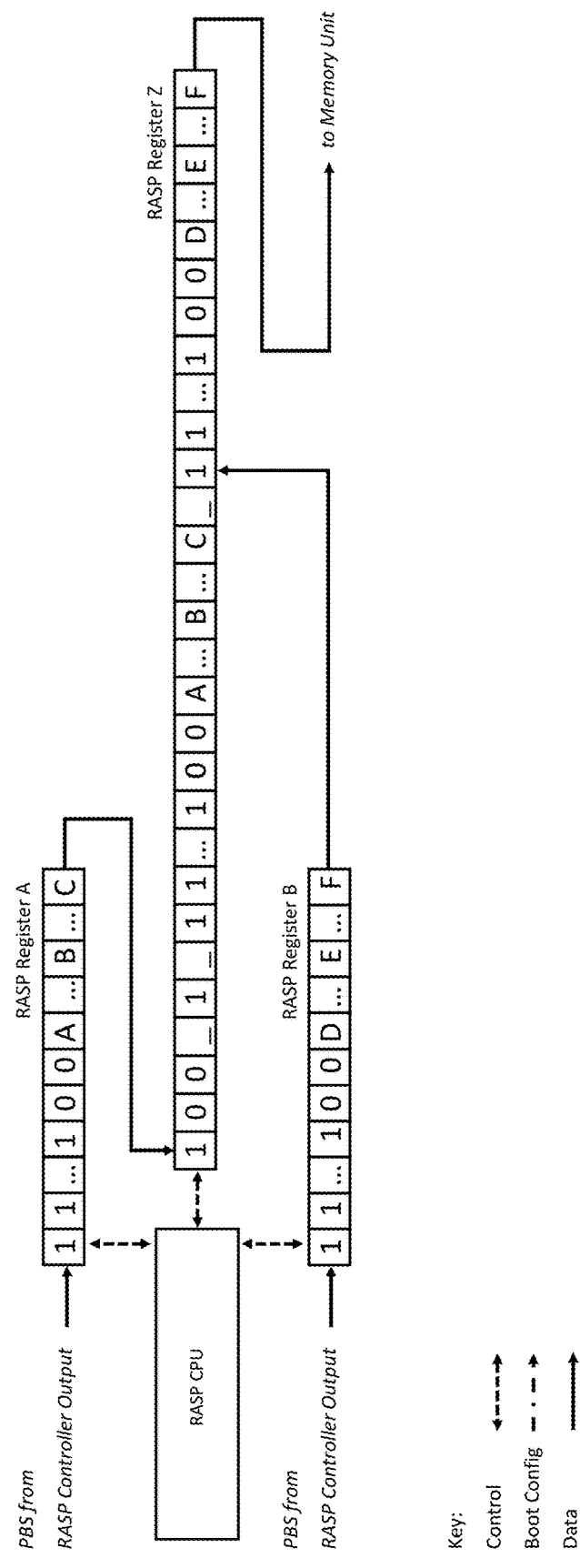
FIG. 4 is a block diagram that illustrates the operation of the RASP Register of FIG. 1 in accordance with the present teachings.

FIG. 4 is a block diagram of an illustrative implementation of the RASP register of FIG. 1 in accordance with the present teachings. FIG. 4 shows a general case example with the details taken from the example of FIG. 15.

The binary operation x #y can run either by a configured or preset pipeline-style circuit or invocation by executable application.

In accordance with present teachings, the '#' operator is an operation that takes in arbitrary primal binary strings and outputs primal binary string that varies with the type of the inputs as set forth in nine bit definitions disclosed herein with respect to FIGS. 7-15.

This a binary operation on PBSs and the exact action of the call depends on the type of PBS (Ord, New, Old). The following describes the action of each of the 9 possible cases and each use of the #-sign invoked by the RASP Register Architecture.

FIG. 5 is a table that illustrates the first few Primal Binary Strings in their natural order as produced by the RASP Formatter of FIG. 1 in accordance with the present teachings. For a more detailed description of the construction method used to create primal binary strings see Operations below.

FIG. 6 is a complete list of commands supported by the RASP computing system of FIG. 1 in accordance with the present teachings.

The following represent a complete definition of the binary operation x #y in a case-by-case fashion. The domain of the operation x #y is the set of all pairs of PBSs, where each element is of exactly one of three type: Ordinal, New Prime, and Old Prime. For a more detailed of the construction methods used to create primal binary strings see Operations below.

Those of ordinary skill in the art will understand that the term 'complete' refers to 'Turing Complete' aka 'Operationally Complete' as these terms are known and used in the art.

Figure 7:
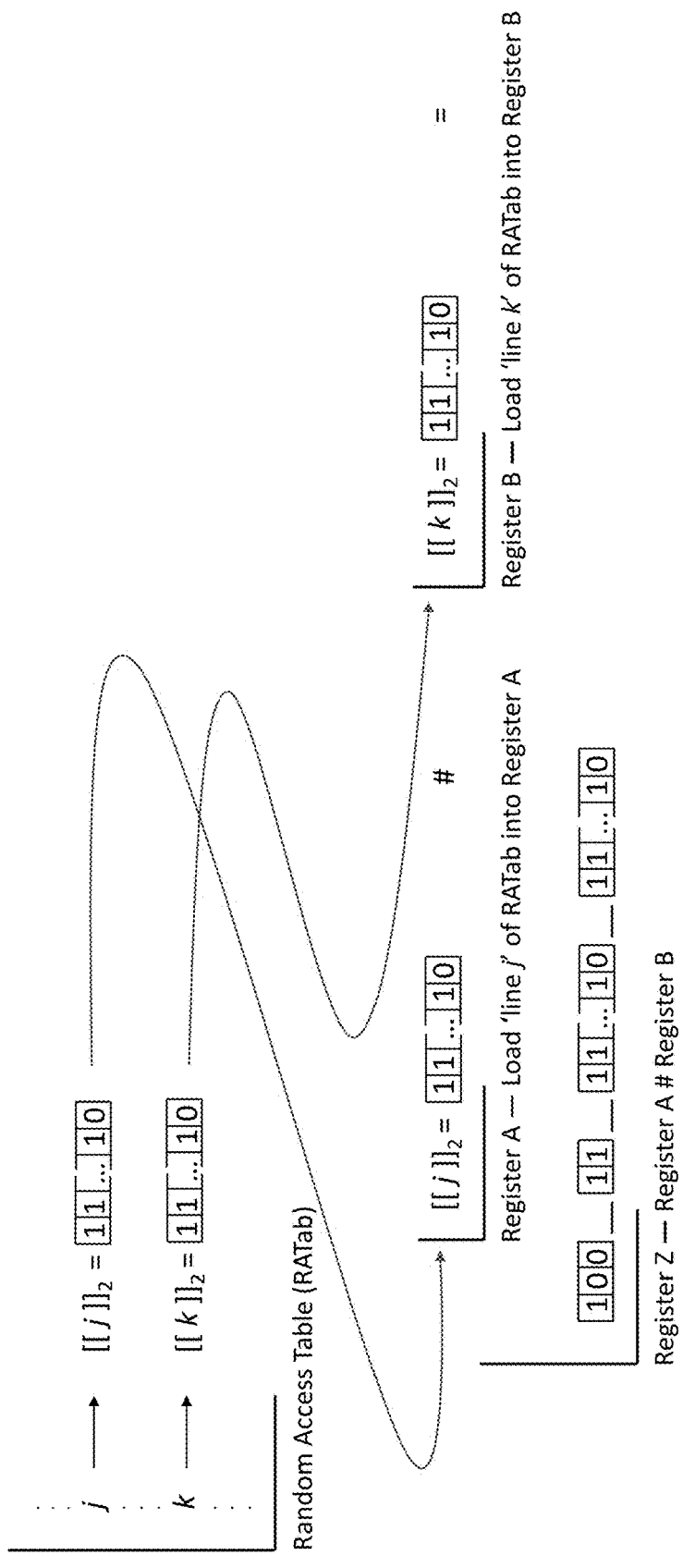
FIG. 7 is a definition of the Ordinal/Ordinal case of the general definition of x #y as described in FIG. 6 and executed in the RASP Registers of FIG. 1 in accordance with the present teachings.

FIG. 7 is a definition of the Ordinal/Ordinal case of the general definition of x #y as described in FIG. 6 (Item 9) and executed in the RASP Registers of FIG. 1 in accordance with the present teachings. For a more detailed description of the construction methods used to create primal binary strings see Operations.

Figure 8:
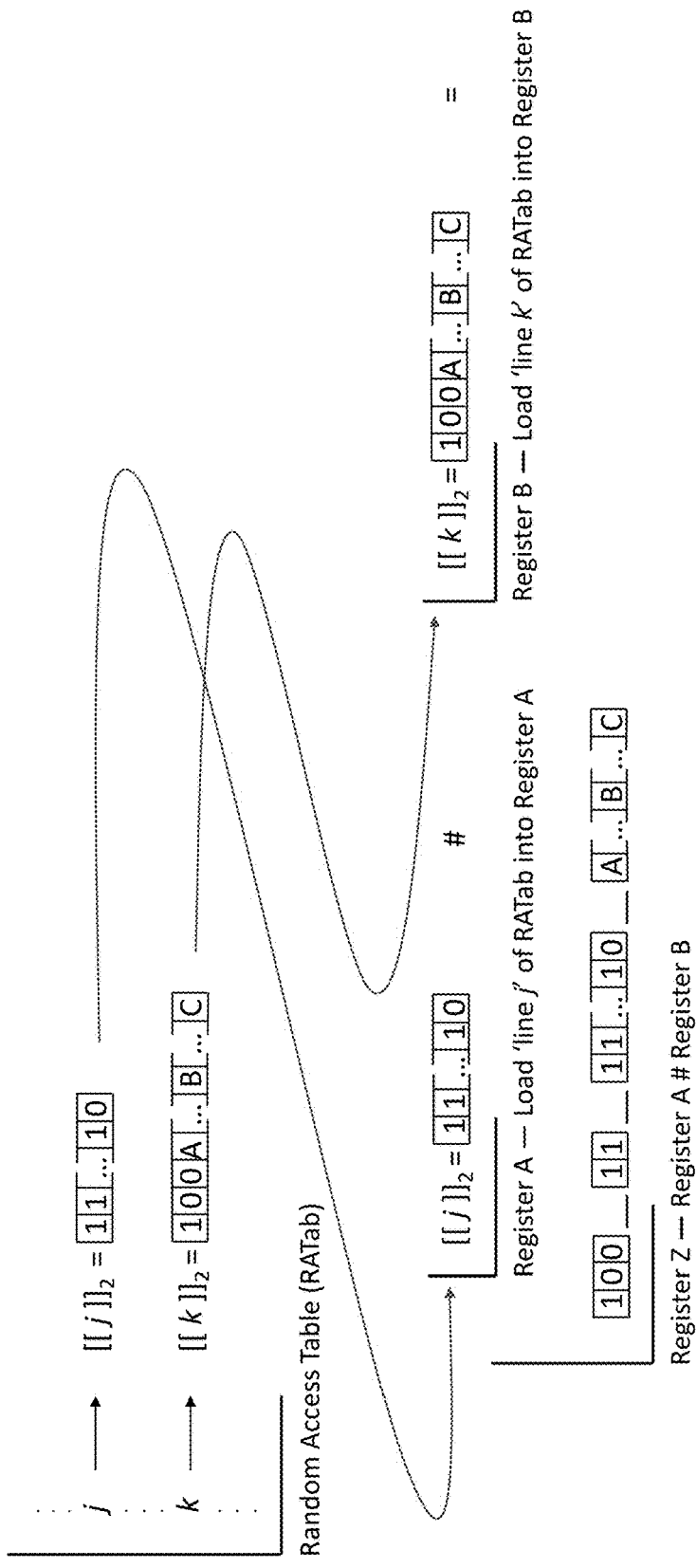
FIG. 8 is a definition of the Ordinal/New Prime case of the general definition of x #y as described in FIG. 6 and executed in the RASP Registers of FIG. 1 in accordance with the present teachings.

FIG. 8 is a definition of the Ordinal/New Prime case of the general definition of x #y as described in FIG. 6 (Item 9) and executed in the RASP Registers of FIG. 1 in accordance with the present teachings. For a more detailed description of the construction method used to create primal binary strings see Operations below.

Figure 9:
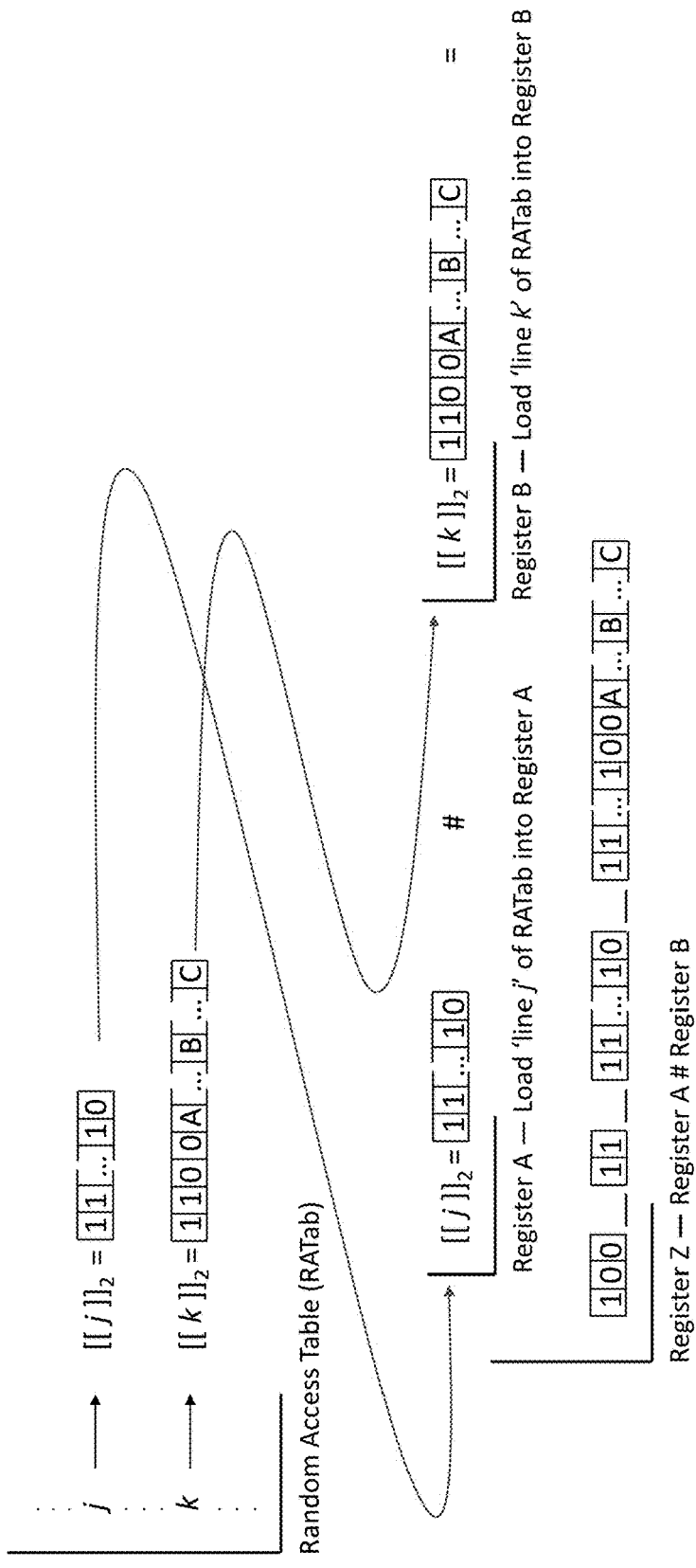
FIG. 9 is a definition of the Ordinal/Old Prime case of the general definition of x #y as described in FIG. 6 and executed in the RASP Registers of FIG. 1 in accordance with the present teachings.

FIG. 9 is a definition of the Ordinal/Old Prime case of the general definition of x #y as described in FIG. 6 (Item 9) and executed in the RASP Registers of FIG. 1 in accordance with the present teachings. For a more detailed description of the construction method used to create primal binary strings see Operations below.

Figure 10:
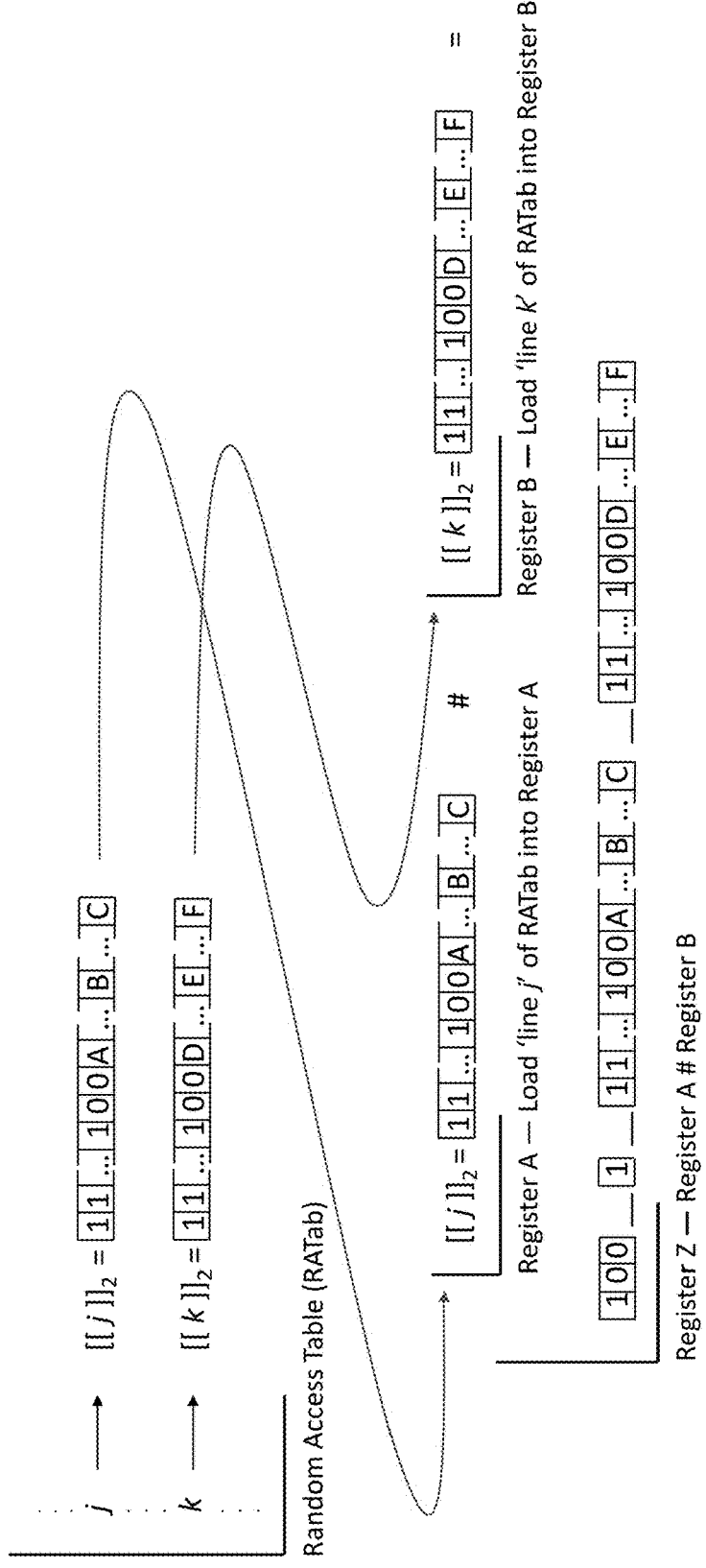
FIG. 10 is a definition of the New Prime/Ordinal case of the general definition of x #y as described in FIG. 6 and executed in the RASP Registers of FIG. 1 in accordance with the present teachings.

FIG. 10 is a definition of the New Prime/Ordinal case of the general definition of x #y as described in FIG. 6 (Item 9) and executed in the RASP Registers of FIG. 1 in accordance with the present teachings. For a more detailed description of the construction method used to create primal binary strings see Operations below.

Figure 11:
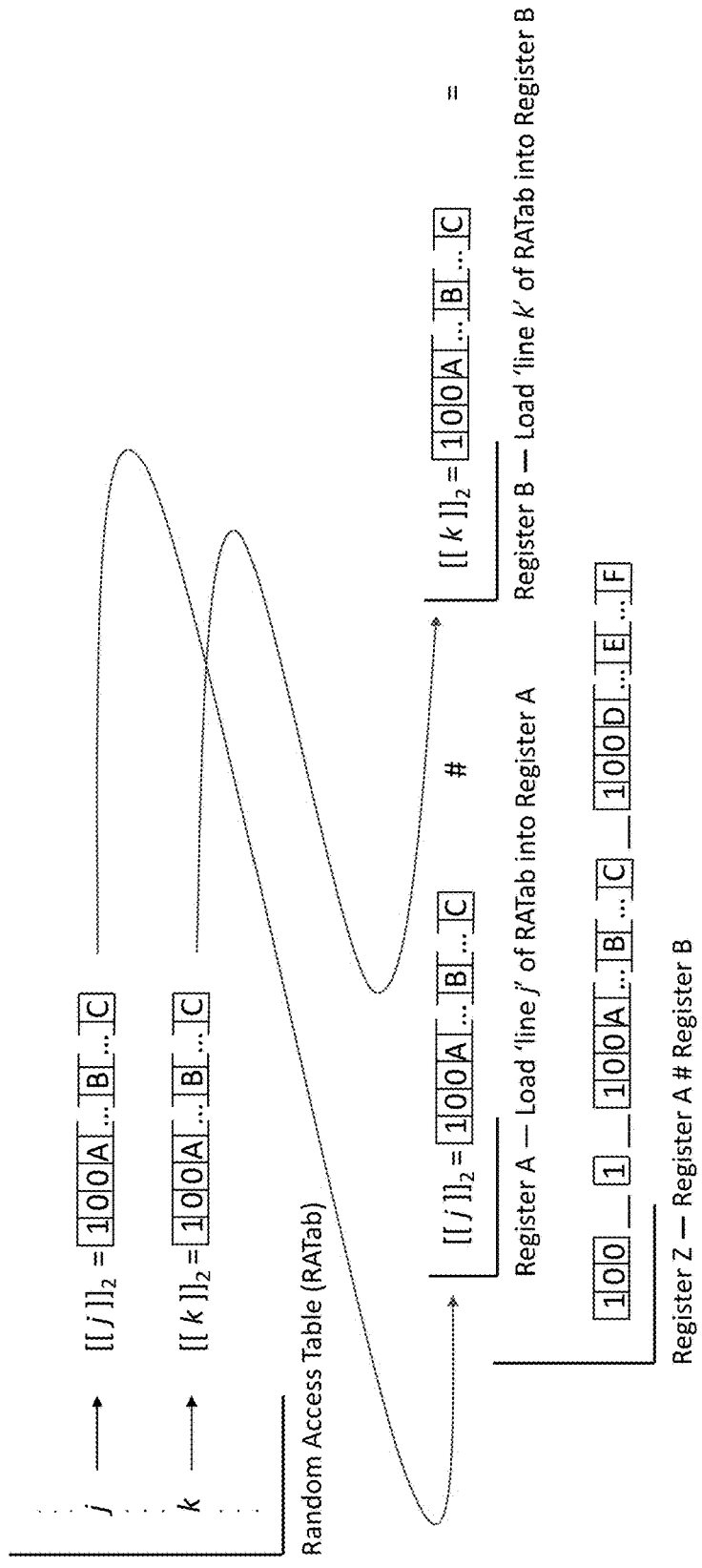
FIG. 11 is a definition of the New Prime/New Prime case of the general definition of x #y as described in FIG. 6 and executed in the RASP Registers of FIG. 1 in accordance with the present teachings.
Figure 12:
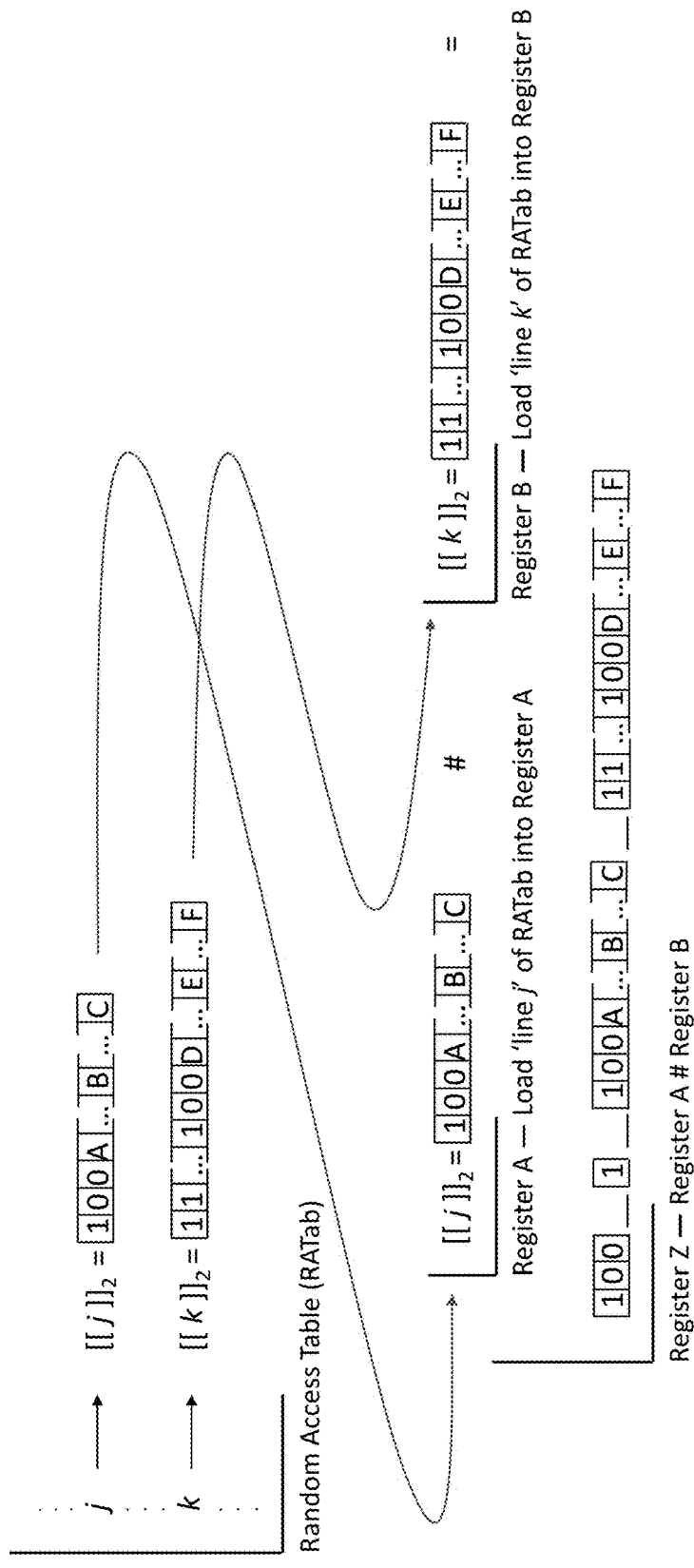
FIG. 12 is a definition of the New Prime/Old Prime case of the general definition of x #y as described in FIG. 6 and executed in the RASP Registers of FIG. 1 in accordance with the present teachings.

FIG. 11 is a definition of the New Prime/New Prime case of the general definition of x #y as described in FIG. 6 (Item 9) and executed in the RASP Registers of FIG. 1 in accordance with the present teachings. For a more detailed description of the construction method used to create primal binary strings see Operations below. FIG. 12 is a definition of the New Prime/Old Prime case of the general definition of x #y as described in FIG. 6 (Item 9) and executed in the RASP Registers of FIG. 1 in accordance with the present teachings. For a more detailed description of the construction method used to create primal binary strings see Operations below.

Figure 13:
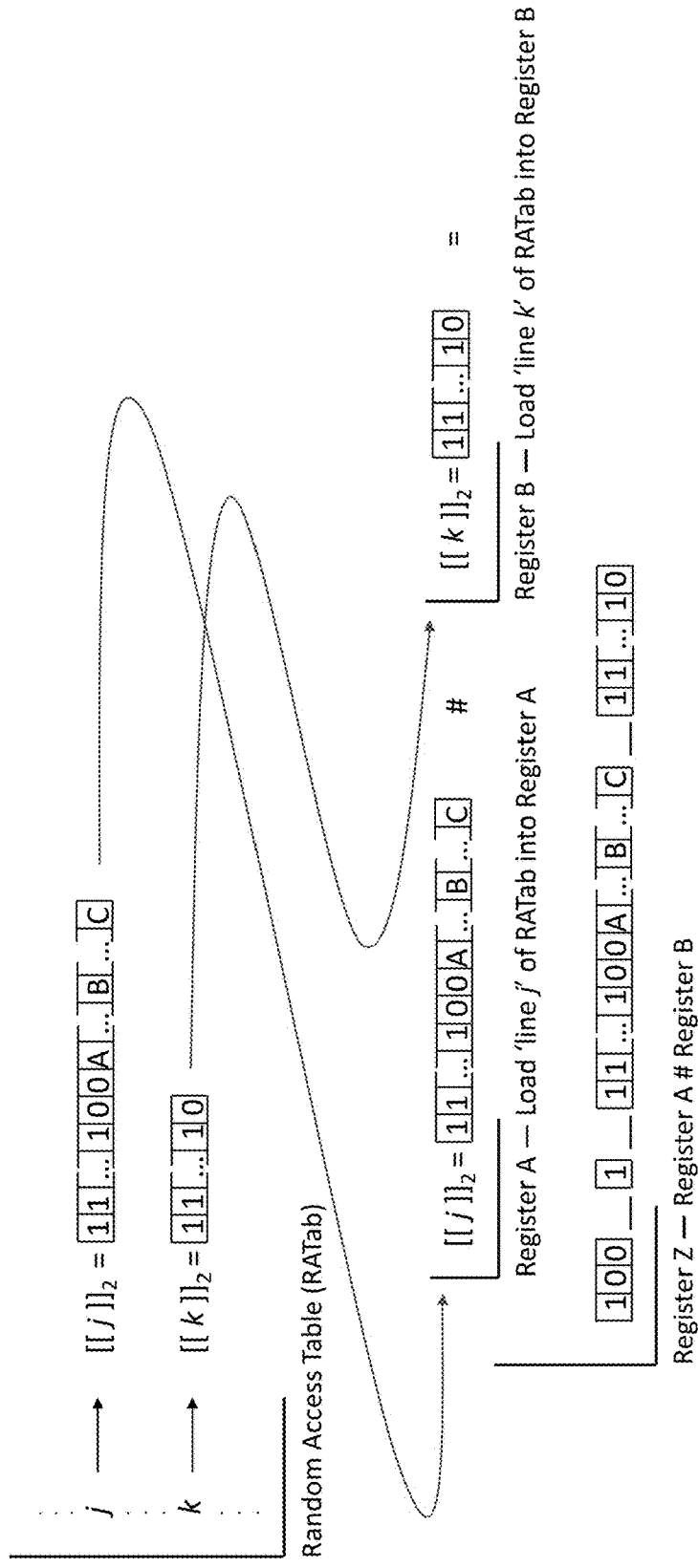
FIG. 13 is a definition of the Old Prime/Ordinal case of the general definition of x #y as described in FIG. 6 and executed in the RASP Registers of FIG. 1 in accordance with the present teachings.

FIG. 13 is a definition of the Old Prime/Ordinal case of the general definition of x #y as described in FIG. 6 (Item 9) and executed in the RASP Registers of FIG. 1 in accordance with the present teachings. For a more detailed description of the construction method used to create primal binary strings see Operations below.

Figure 14:
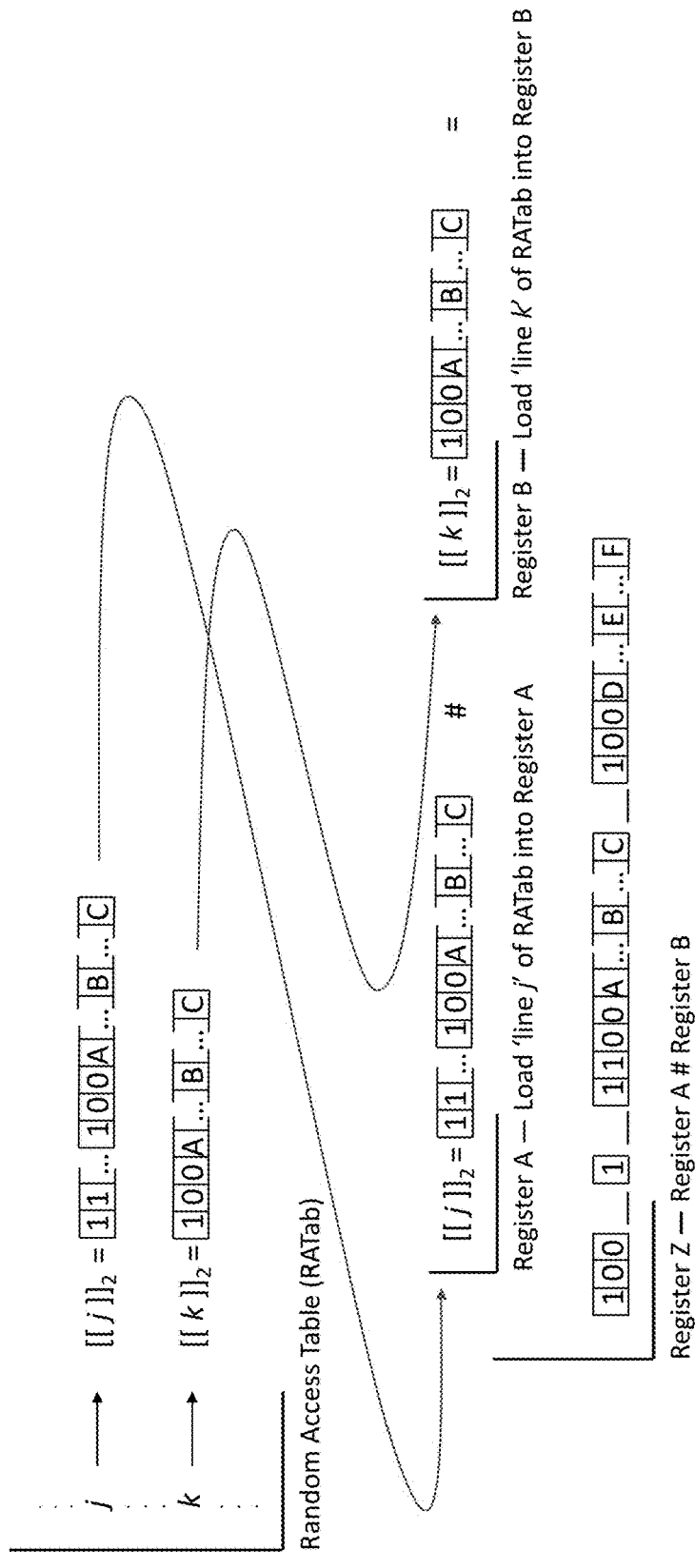
FIG. 14 is a definition of the Old Prime/New Prime case of the general definition of x #y as described in FIG. 6 and executed in the RASP Registers of FIG. 1 in accordance with the present teachings.

FIG. 14 is a definition of the Old Prime/New Prime case of the general definition of x #y as described in FIG. 6 (Item 9) and executed in the RASP Registers of FIG. 1 in accordance with the present teachings. For a more detailed description of the construction method used to create primal binary strings see Operations below.

Figure 15:
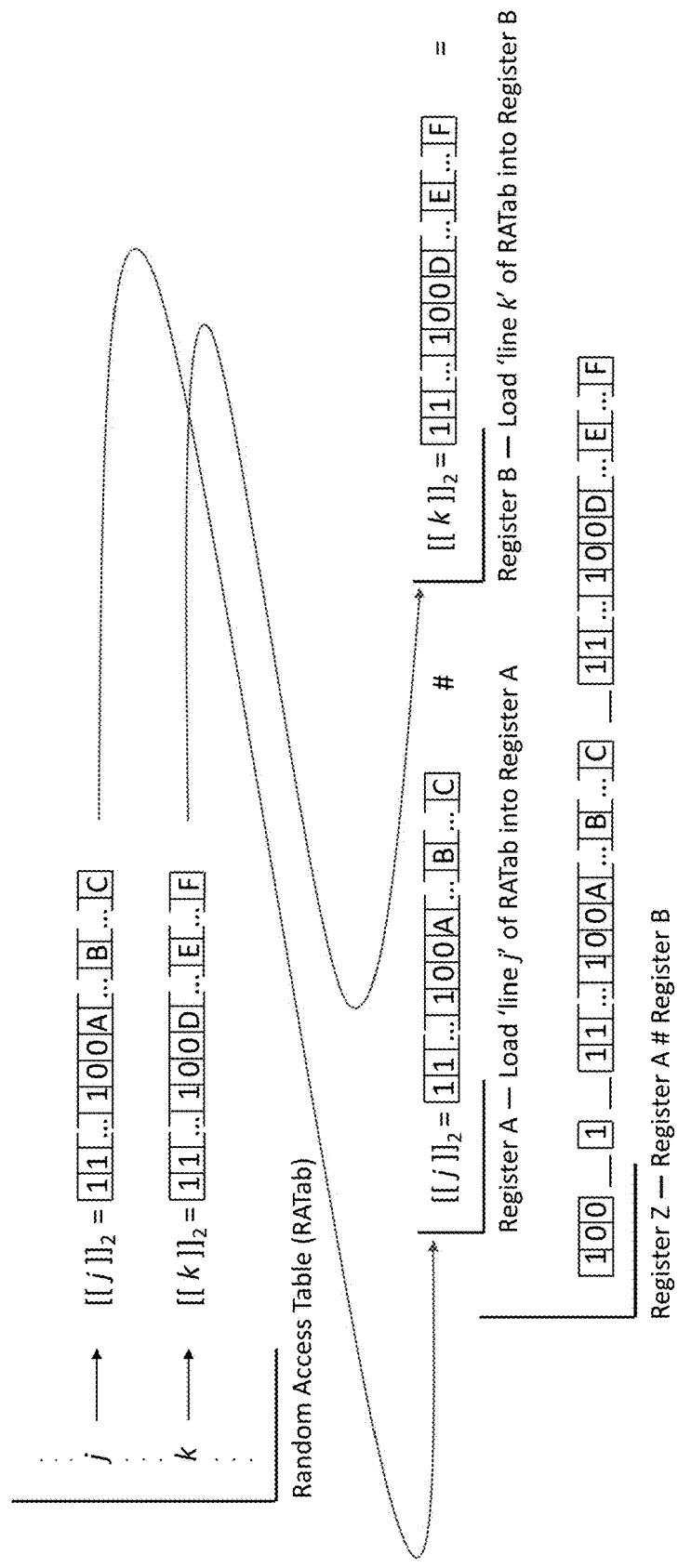
FIG. 15 is a definition of the Old Prime/Old Prime case of the general definition of x #y as described in FIG. 6 and executed in the RASP Registers of FIG. 1 in accordance with the present teachings.

FIG. 15 is a definition of the Old Prime/Old Prime case of the general definition of x #y as described in FIG. 6 (Item 9) and executed in the RASP Registers of FIG. 1 in accordance with the present teachings. For a more detailed description of the construction method used to create primal binary strings see Operations below.

FIGS. 7-15 represent a precise definition of the binary operation x #y in a case-by-case listing. The domain of the operation x #y is the set of all PBSs, where each element of the pair of #-sign arguments is of exactly one type: Ordinal, New Prime, or Old Prime as specified in FIG. 6 (Item 9) in accordance with the present teachings. It is commonly understood that hierarchical operations and their organization depend on the manipulation of finite, ordered or unordered, tree data structures. It is also commonly understood that the trees so manipulated, to be useful, must pay the price of storing, in their nodes or as links, either natural numbers or bits of data.

However, it has been discovered surprisingly that that this common data structure understanding is not true, and in fact what is true is that the finite-unlabeled tree structure, under their normal operations, is isomorphic to the finite trees storing binary data in their nodes, under their normal operations. This simple observation, in hindsight, shows the extreme complexity of this isomorphism, but the isomorphism itself provides new, efficient and useful translation between the structures.

In particular, the invention provides a new Random Access Stored Program ("RASP") Register Machine based on a weak-monadic second-order finite tree description language, and then uses this RASP Machine to build a B-tree link creation apparatus using certain primal strings as the names of the individual B-trees in the forest of B-trees and certain primal strings, or sets of primal strings, as the name or names of a position or positions, within each B-tree in the forest.

In addition, the invention provides the individual B-tree names and the names for the marked position or positions within a named B-tree can be combined to form a primal string that acts as an ordered pair consisting of the B-tree name and the B-tree named position or positions within the named B-tree. Combining two such primal ordered pairs into a new primal ordered pair forms the collection of all possible directed links between the nodes in the B-tree forest. Manipulating these directed links forms and defines the new forest B-tree file structure.

After the linear sequence, or list data structure the most common data structure of computer science is the B-tree, a structure that is sometimes named "S2S" and is described formally as the structure based on the collection of all finite strings together with concatenation, the most natural of associated binary operations, i.e. As described hereinbelow, the invention provides a method for creating a navigable forest of B-trees and note that the method shown can be extended to create forests of many common data structures, including the ability to describe a forest of Unix file structures, and corresponding systems and software.

The functionality provided by this new file structure, called the primal file structure is the ability to efficiently move to any node of any B-tree in a forest of similar nodes or from any other node in any B-Tree in the forest, different or not.

The first key construction uses the prime natural numbers to identify or name the B-tree in the forest of B-trees and to do this using finite binary strings in a random-access table. This table grows to line k using less than 2 k $Log_2(k)$ bits of space.

The second key construction uses a special non-composite form of the primal strings to identify the location or position (s) named in the named B-tree pointed at. In essence, these particular primal strings mimic the usual form of the binary strings that describe $radix_2$ notation.

Lastly, each primal ordered pair of [name, position(s)] is stored as a single primal string, and this is done at a minimal cost in extra bits. Manipulating the universe of primal ordered pairs as single primal strings using the methods listed can be seen as a new file structure allowing movement from any B-Tree and any set of places within that tree to any tree in the forest with a particular set of named places and to do this using the elementary and weak second-order methods of RASP Register Machine provided by the present invention.

Finally, the invention provides primal predicates required by the new file structure and shows how each of these parts can be defined from the elementary and weak monadic second-order methods of the core machine.

Operation

In one embodiment, the present invention provides an electronic computing system, including an electronic processing unit configured to electronically operate on electronically encoded data and executable program instructions. The electronic computing system of the invention comprises a data store configured to retain the electronically encoded data and executable program instructions for retrieval by the electronic processing unit, and further retain additional electronically encoded data and executable program instructions provided by the electronic processing.

To begin a more precise development of the core ideas we first define the programming element that define the primal register machine. There are three different kind of operation: (A) placing well-formed primal binary string in their natural positions within the primal register machine table. (B) moving stings from the table and placing them in registers or moving strings from registers and placing them back in the table. And (C) operating on the primal binary strings x and y using the binary primal binary string operation #to form the primal binary string x #y.

The list of legal operations (see FIG. 6) follows from a simple set register operation. Note that each of the weak-monadic second-order operations above can be defined as a construction based upon elementary operations, and all operations of our machine are derivable from within the standard string model.

asking if X is empty;
asking if x is an element of X;
asking if X is a singleton multiset;
asking if X=Y;
asking if X intersects Y is Z, or part of Z; and
asking if X union Y is Z, or part of Z.

Having been created by the Formatter subroutine it can be assumed, without loss of generality, that any output from the RASP Formatter is a well-formed primal binary string, with each string having one of three types. We will use this distinction to define the binary operation x #y as a binary operation operating on the well-formed primal binary strings. The three types are:

Ordinal primal binary strings consisting of a finite sequence of "1" characters terminated with a single "0" character. Primal binary strings of this type look like <111 . . . 0>.

New primal binary strings consisting of "100" concatenated to the unordered concatenation of two or more primal binary strings; Primal binary strings of this type look like <1001 . . . 0>.

Old primal binary strings consisting of "1" concatenated to the unordered concatenation of two or more primal binary strings. Primal binary strings of this type look like <11 . . . 1001 . . . 0>.

Since, by the rules of the language used to program RASP machine (the PBS machine) the operation of x #y is the only operation that can be used to change or combine data in the registers of the machine.

This means that to define the operation x #y as a binary operation on the PBSs we need only define this operation on each of the nine different ways that the types can be combined. The appropriate nine definitions follow as FIGS. 7-15.

Each case begins with selecting two different PBSs from the table. These two PBSs are then concatenated to each other and then adjusted as described in the appropriate figure.

Finally note the since the primal binary register machine can be identified with the algebraic structure that is based on the set of all primal binary strings, naming the strings <10>, <110>, <1110>, and <11110> while supporting the single operation of set insertion into. Further, since this structure is isomorphic to the core structure generated by the two elementary equations of being a right zero, RZ (x #B=B), and left commutative LC (x #(y #z)=y #(x #z)) it follows that the elementary theory of this model is recursively enumerable and elementarily complete.

Thus, the present invention provides an efficient electronic computing system, including an electronic processing unit configured to electronically operate on electronically encoded data and executable program instructions, comprising a data store configured to retain the electronically encoded data and executable program instructions for retrieval by the electronic processing unit, and further retain additional electronically encoded data and executable program instructions provided by the electronic processing, the electronically encoded data and executable program instructions and retained the electronically encoded data and executable program instructions being organized on the data store using a primal file structure as described hereinabove.

In some embodiments, the primal file structure defines a B-tree structure. The B-tree structure can be part of a forest of B-tree structures; among those embodiments are those for which each root of the B-tree is defined by a natural number expressed in primal notation. In more specific embodiments, each unique root of the B-tree is identified by a prime natural number larger than 2; and more specifically, each unique root of the B-tree is stored as the left-hand element of an ordered pair.

Other embodiments of the electronic computing system having a primal file structure are those for which the electronically encoded data is comprised of binary primal strings forming a random-access table. In all embodiments, the random-access table uses fewer than $2*\text{Log}_2(p)$ bits to represent the $p^{th}$ primal string stored on line p of the random-access table, for any prime p.

To be more specific in defining the random-access table we define: the first element of the random-access table to be the two character sequence <10>; the second element of the random-access table to be the three character sequence <1110>; the third element of the random-access table to be the four character sequence <110>; and the fourth element of the random-access table to be the five character binary sequence <11110>.

The following rules generate new finite primal binary strings from previously constructed finite primal binary strings. For example:

If m is a natural number that is represented as an ordinal primal binary string then the string <11>_<111 ... 0> is also a finite primal binary string and this string is stored by RASP Table using the random-access table to find its place.

If m is a prime natural number and is not represented as an ordinal primal binary string then <1>_<111 ... 10> is also a finite primal binary string and this string is store by RASP using its random-access capacity to find its place.

We can assume, without loss of generality, that m is the product of two primes u and v, i.e. k=u*v, and that u is represented by the primal binary string $<1 \ldots 0>_u$ and that v is represented by the binary string $<1 \ldots 0>_v$ then the primal binary string $<100>\_<1 \ldots 10>_u\_<1 \ldots 0>_v$ is store by RASP using its random-access capacity to find its place.

FIG. 5 shows the first few rows of the RASP table.
  Column 1 show the prime arithmetic square notation for each natural number k.
  Column 2 shows the index value of each prime using a three-character algebra.
  Column 3 show the primal binary strings that describe the prime natural number associated with line k.

As a summary it should be noted that the natural number k is associated with the binary primal value of the $k^{th}$ odd prime number.

Multiple products of previously constructed primal binary strings are managed as multiple concatenation rather than just two term products. In another aspect, the present invention provides methods for implementing the operation of the above-described electronic computing system.

In still another aspect, the present invention provides non-ephemeral, computer—readable media containing computer-readable program code instructions for implementing the operation of the above-described electronic computing system.

In short, the invention addresses the need in the art by seeing each natural number as the finite multi set of its prime factors. These multiset elements can be represented as particular well-formed binary primal strings allowing multiplication, as an arithmetic operation, to be seen as a concatenation of the binary primal strings that represent the factors, a string-oriented operation. In addition to being able to test any two binary primal strings for finite labeled tree equality the invention defined above allows for the use of a single binary operation, x #y, when creating new primal binary strings using the binary primal terms, x and y.

In the illustrative embodiment, the invention described herein may be implemented in digital electronic circuitry, or in computer hardware, firmware, software, or in combinations thereof, typically as various data structures held in the memory of a computer and program code, also stored in computer memory, that instructs one or more computer processors to manipulate the data structures according to disclosure herein.

The file structures described herein and other relevant information is stored, manipulated, and transmitted using such digital electronic circuitry, or in computer hardware, firmware, software, or in combinations thereof.

However, the apparatus of the invention can be implemented in a computer program tangibly embodied in a machine-readable storage device implemented in a physical medium for execution by a programmable processor and the method steps of the invention can be performed by a programmable processor executing a program of instructions to perform functions of the invention by operating on input data and generating output.

The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a computer memory device, such as, but not limited to, read-only memory and random-access memory. Generally, a computer will include one or more mass storage devices for storing data files; such devices include magnetic disks, such as internal hard disks and removable disks; magneto-optical disks; and optical disks.

Storage devices suitable for tangibly embodying computer program instructions and data described herein include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). All of these are referred to herein generally as "computer-readable media containing computer-readable program control devices."

To provide for interaction with a user, the invention can be implemented on a computer system having a display device such as a monitor or LCD screen for displaying information in conjunction with the inversion to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and output to the network, for example, in the form of a computer data signal embodied in a carrier wave. The above-described devices and materials will be familiar to those of skill in the computer hardware and software arts.

It should be noted that the present invention employs various computer-implemented operations involving data, in particular data described above in conjunction with the invention, stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated.

However, the invention may also be implemented optically or in a quantum computing system without departing from the scope of the present teachings.

The operations described herein that form part of the invention are useful machine operations. The manipulations performed are often referred to in terms, such as, producing, identifying, running, determining, comparing, executing, downloading, or detecting. It is sometimes convenient, principally for reasons of com-mon usage, to refer to these electrical or magnetic signals as bits, values, elements, variables, characters, data, or the like. It should be remembered however, that all of these and similar terms are to be associated with the appropriate physical quantities and are merely convenient labels applied to these quantities.

The present invention also relates to devices, systems or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

The above description of the embodiments, alternative embodiments, and specific examples are given by way of illustration and should not be viewed as limiting. Further, many changes and modifications within the scope of the present embodiments may be made without departing from the spirit thereof, and the present invention includes such changes and modifications.

Those having ordinary skill in the art and access to the present teachings will recognize additional modifications, applications and embodiments within the scope thereof.

It is therefore intended by the appended claims to cover any and all such applications, modifications and embodiments within the scope of the present invention.

The invention claimed is:

1. An efficient primal computing system comprising:
a user interface for providing user input and output;
a RASP controller operationally coupled to the user interface including::
   a central processing unit implemented with a microprocessor adapted to program instructions stored in a tangible medium and
   at least one RASP registers configured to store encoded data;
a RASP formatter operationally coupled to the RASP controller;
RASP memory operationally coupled to the RASP controller and the RASP formatter; and
a boot memory operationally coupled to the central processing unit and including program instructions for execution by the central processing unit,
whereby the RASP formatter and RASP memory operate under the control of the central processing unit to effect data storage and retrieval using a primal file structure, said primal file structure defining a B-tree structure and said B-tree structure being part of a forest of B-tree structures, wherein each root of said B-tree in said forest of B-trees is named by a prime natural number larger than two, said prime natural number being expressed in primal notation and further wherein said prime natural number is the left component of a primal ordered pair.

2. The computing system of claim 1 including an input buffer adapted to store electrical signals representing an arbitrary finite data sequence.

3. The computing system of claim 2 wherein the RASP formatter is operationally coupled to the input buffer and includes a converter adapted to convert the finite data sequence into a natural number.

4. The computing system of claim 3 wherein the RASP formatter further includes a multiplier operationally coupled to the converter and adapted to factor the natural number.

5. The computing system of claim 3 wherein the RASP formatter further includes an adder operationally coupled to the divider and adapted to concatenate indices of the factored natural number to form a primary binary string and store the primary binary string in the RASP memory.

6. The computing system of claim 1 wherein each root of each B-tree structure is defined by a natural number expressed in primal notation.

7. The computing system of claim 6 wherein each unique root of each B-tree structure is identified by a prime natural number larger than 2.

8. The computing system of claim 7 wherein each unique root of each B-tree structure is stored as the left-hand element of an ordered pair.

9. The computing system of claim 8 wherein said encoded data is comprised of binary primal strings forming a random access table.

10. The computing system of claim 9 wherein said random access table uses fewer than $O(2 k \operatorname{Log}_2(k))$ bits to represent the first k elements of said random access table.

11. The computing system of claim 6, wherein the first element of said random access table is the finite binary sequence <0>, and the second element of said random access table is the finite two-long binary sequence <10>.

12. The computing system of claim 7, wherein said random access table is based on the natural number index wherein the $k^{th}$ element of said random access table <11> RAT(j), where RAT(j) is the $j^{th}$ element of said random access table, if q(j)=k, and RAT(j) is the 0/1 dual of a power of 2 when read from right to left.

13. The computing system of claim 8, wherein said random access table is based on the natural number index wherein the $k^{th}$ element of said random access table <1> RAT(j), where RAT(j) is the $j^{th}$ element of said random access table, if q(j)=k, and RAT(j) is not the 0/1 dual of a power of 2 when read from right to left.

14. The computing system of claim 10, wherein each root of said B-tree in said forest B-trees is named by a unique prime natural number larger than two, and wherein a binary primal sequence is associated with said unique root of said B-tree, and further wherein said binary primal sequence is stored as the marked position in the right-hand element of a primal ordered pair.

15. The computing system of claim 11, wherein each root of said B-tree in said forest B-trees is named by a unique prime natural number larger than two, and wherein a finite multiset of binary primal sequence is associated with said unique root of said B-tree, and further wherein said binary primal sequence is stored as the marked positions in the right-hand element of a primal ordered pair.

16. An efficient primal computing method, executed by an efficient computing system, comprising the steps of:
inputting, by a central processing unit implemented with a microprocessor adapted to program instructions stored in a tangible medium, a finite binary string;
converting, by the microprocessor, the finite binary string into a primal binary string;
storing, by the microprocessor, the finite binary string in a random access table; and
organizing and manipulating, by the microprocessor, primal binary strings in the table in accordance with operations allowed by the rules of a B-tree based programming language that allows only equality queries and the binary adjunction operation.

* * * * *